(12) United States Patent
Dalessandro et al.

(10) Patent No.: US 6,908,228 B2
(45) Date of Patent: Jun. 21, 2005

(54) LINEAR MOTION BEARING SEGMENT

(75) Inventors: Frank Dalessandro, Bayside, NY (US); Scott Carlson, Port Washington, NY (US); Alison Ng, New York, NY (US)

(73) Assignee: Danaher Motion, Port Washington, NY (US)

( * ) Notice: Subject to any disclaimer, the term of this patent is extended or adjusted under 35 U.S.C. 154(b) by 58 days.

(21) Appl. No.: 10/399,424

(22) PCT Filed: Oct. 24, 2001

(86) PCT No.: PCT/US01/50897

§ 371 (c)(1),
(2), (4) Date: Oct. 14, 2003

(87) PCT Pub. No.: WO02/055895

PCT Pub. Date: Jul. 18, 2002

(65) Prior Publication Data

US 2004/0076348 A1 Apr. 22, 2004

Related U.S. Application Data

(60) Provisional application No. 60/242,850, filed on Oct. 24, 2000.

(51) Int. Cl.[7] .............................................. F16C 29/06
(52) U.S. Cl. ........................................... 384/43; 384/44
(58) Field of Search .............................. 384/43, 44, 45; 464/168

(56) References Cited

U.S. PATENT DOCUMENTS 3,565,137 A   2/1971   Alsruhe
4,005,913 A   2/1977   Thomson, Jr.
4,128,278 A   12/1978  Headen et al.
4,152,961 A   5/1979   Batson

FOREIGN PATENT DOCUMENTS

| DE | 3503027  | 10/1985 |
|----|----------|---------|
| DE | 4409540  | 11/1994 |
| GB | 2100365  | 12/1982 |
| WO | 99/25983 | 5/1999  |

Primary Examiner—Lenard A. Footland
(74) Attorney, Agent, or Firm—Dilworth & Barrese LLP.

(57) ABSTRACT

A linear motion bearing assembly (20) as provided for movement along a splined shaft (10). The rolling element retainer of the bearing assembly (20) is assembled from a plurality of arcuate interengageable self-contained rolling element retainer segments (22). Each of the rolling element retainer segments (22) includes at least one rolling element track (30) having a load bearing portion (34) and a return portion (36). At least one load bearing plate (44) is axially positioned in each segment and serves to receive and transmit loads from the bearing rolling elements (32) in the load bearing portion (34) of the ball tracks (30). An extended housing retainer structure encloses all of the exposed exterior surfaces of the rolling element retainer segments (22) and is configured and dimensioned to maintain the rolling element retainer segments (22) in position and to receive a load either directly or indirectly from the load bearing plates (44).

20 Claims, 7 Drawing Sheets

LINEAR MOTION BEARING SEGMENT

CROSS REFERENCE TO RELATED APPLICATIONS

The present application claims priority to U.S. provisional application Ser. No. 60/242,850 filed on Oct. 24, 2000, the entire contents of which are hereby incorporated by reference.

BACKGROUND

1. Technical Field

The present invention relates to linear motion bearing and, more particularly, to linear motion bearing assemblies made up of bearing segments for longitudinal movement along a splined shaft.

2. Background of Related Art

The present invention is directed to an improved linear motion bearings assembly for use on a splined shaft. In particular, the improvements relate to biased linear motion bearing assemblies of the type which support a carriage or a pillow block for linear movement along an elongated splined shaft. These bearing assemblies can either be of the open type or the closed type.

Typical linear rolling bearing assemblies include a series of rolling elements moving about a circulation path which circulation path is formed in the periphery of a track member and a surrounding and enclosing bearing cover confining the rolling elements in their recirculation path. In order to achieve an accurate linear motion, the axis of the bearing assembly must be precisely aligned with the desired direction of motion along the supported structure. In addition this precise alignment also minimizes skewing forces acting on the bearing assembly, which skewing forces tend to reduce the load/life performance of the bearing assembly.

Installation of such bearing assemblies on a supporting structure (i.e., shaft, splined shaft, guideway or rail) typically involves precision machining of locating surfaces in order to properly align the bearing assembly on the supporting structure. Such bearing assemblies are typically installed in sets, each comprised of a number of variously facing bearings such as to engage a series of surfaces on the supporting structure (i.e., such as above and below a supporting surface and/or along a lateral edge of a supporting surface). In such instances it is usual to provide a bearing adjustment for enabling precision adjustment of the bearing assembly on the supported structure and also for establishing a proper bearing pre-load by adjusting an opposing bearing assembly for reasons well known to those skilled in the art. In such installations, considerable precision machining of the supported structure is necessitated which is difficult and expensive to accomplish on the supporting structures.

Additional prior art bearing assemblies typically include an outer housing and at least one ball retainer dimensioned for insertion into the outer housing. The rolling element retainer has at least one ball track in a loop configuration for containing and recirculating bearing balls therein. The ball tracks typically include open portions which facilitate a load transfer from a supporting shaft to a load bearing structure such as load bearing plates operatively associated with either the ball retainer or the outer housing while return portions of the ball tracks permit continuous recirculation of the bearing balls through the ball tracks during linear motion.

In some embodiments, the ball retainer is formed as a monolithic element with the ball tracks integrally incorporated therein. See, U.S. Pat. No. 3,767,276 to Henn. This structure, however, is difficult to efficiently manufacture because of the complex molds required. Also, these ball retainers, prior to insertion into a mounting carriage or outer housing are necessarily open and thus exposed to ambient conditions and contaminants such as dust and dirt. Such exposure could deleteriously affect the operation and life of the bearing assembly as well as the support structure on which it moves.

Self-contained linear bearing units are also known in the art. See, e.g. U.S. Pat. No. 4,815,862 to Mugglestone et al. This unit, while representing a marked improvement in the art, still requires the use of end caps to engage the load bearing plates of the bearing segments. Further, the load bearing plates must be precisely machined to properly inter-fit with the end caps. This configuration adds to the expense and complexity of the bearing.

The load bearing structure may be in the form of integral elements formed on an inner radial surface of the outer housing. Typical bearing assemblies utilizing load bearing structures formed in the outer housing are shown, for example, in commonly owned U.S. Pat. No. 5,046,862 to Ng, the disclosure of which is incorporated herein by reference.

In lieu of integral load bearing structure, separate load bearing plates may be used to transfer loads from the supporting shaft. These load bearing plates are longitudinally oriented in association with the ball retainer so as to engage at least those bearing balls in direct contact with the support shaft. These load bearing plates may also be configured to be axially self-aligning by providing structure which permits the plates to rock into and out of parallelism with the longitudinal axis of the ball retainer. See, for example, commonly owned U.S. Pat. No. 3,545,826 to Magee et al. Individual load bearing plates may be expanded transversely so as to engage bearing balls in corresponding adjacent load bearing tracks. In this form, parallel grooves are formed in the underside of the plates to guide the bearing balls while they are in the load bearing portion of the ball tracks. See, for example, U.S. Pat. No. 3,951,472 to Schurger et al.

Accordingly, it is an object of the present invention to provide a linear motion bearing segment which can be easily and efficiently manufactured.

It is another object of the present invention to provide a linear motion bearing assembly having a rolling element retainer and outer housing which are easily fabricated using engineering polymers, powder metal or insert molding.

It is a further object of the present invention to provide a low cost linear motion bearing assembly having a high load bearing capacity and having self-aligning capability.

It is yet another object of the present invention to provide a bearing assembly which eliminates the need for extremely high precision rolling element/guideway (rail) bearing assemblies and their resultant expensive manufacturing costs.

These and other highly desirable objects are accomplished by the present invention in a linear motion bearing assembly having a plurality of rolling element tracks and individual bearing plates arranged in a rolling element retainer and enclosed by a low cost outer housing which serves to protect the rolling elements, rolling element tracks and load bearing plates without having to transmit loads from the bearing rolling elements to the carriage block into which the bearing assembly is mounted.

Objects and advantages of the invention are set forth in part herein and in part will be obvious therefrom, or may be learned by practice with the invention, which is realized and attained by means of instrumentalities and combinations pointed out in the appended claims. The invention comprises the novel parts, constructions, arrangements, combinations, steps, processes and improvements herein shown and described.

SUMMARY OF THE INVENTION

The present invention provides for a linear motion bearing segment configured and adapted for movement along a splined shaft, guideway or rail. A rolling element retainer structure of the bearing assembly can be either monolithically formed or, alternatively, assembled from multiple elements. In a first multi-element embodiment, the rolling element retainer structure is made up of a pair of quarter arcuate rolling element retainer segments and a half arcuate rolling element retainer segment. In an alternate multi-element embodiment, the rolling element retainer structure is made up of a pair of half arcuate rolling element retainer segments. At least a portion of the axial rolling element bearing tracks are formed in the rolling element retainer structure and, preferably, the complete rolling element bearing tracks are formed therein.

The linear motion bearing assembly further includes an outer housing sleeve which substantially encloses all of the rolling element retainer structure. The housing sleeve is preferably formed of an engineering polymer and serves to protect the rolling element retainer and bearing rolling elements contained therein from ambient contamination.

A plurality of load bearing plates are axially positioned within the outer housing and serve to receive and transmit loads from the bearing rolling elements to the load bearing portion of the rolling element bearing tracks. Each load bearing plate is at least partially retained in the linear motion bearing assembly by retaining features which are disposed at least partially around the rolling element retainer structures and which retain at least a portion of the load bearing plates. Preferably, the load bearing plates and/or plate retaining features are configured and dimensioned such that the linear motion bearing assembly is substantially self-aligning on the shaft.

BRIEF DESCRIPTION OF THE DRAWINGS

The accompanying drawings, referred to herein and constituting a part hereof, illustrate the preferred embodiments of the linear motion bearing segment of the present invention and, together with the description, serve to explain the principles of the invention.

DETAILED DESCRIPTION OF PREFERRED EMBODIMENTS

Referring now to the drawings, wherein like reference numerals identify similar structural elements of the subject invention, there is illustrated in FIGS. 1–5 a closed-type linear motion bearing segment constructed in accordance with a preferred embodiment of the present invention and designated generally by the reference numeral 20. As used herein, the term ball and rolling element are intended to be used interchangeably and encompass namely, ball bearings, roller bearings, needle bearings, axle bearings, etc. While a closed-type linear motion bearing segment is disclosed, it is envisioned that an open type linear motion bearing segment can be constructed in accordance with the present disclosure.

Figure 1:
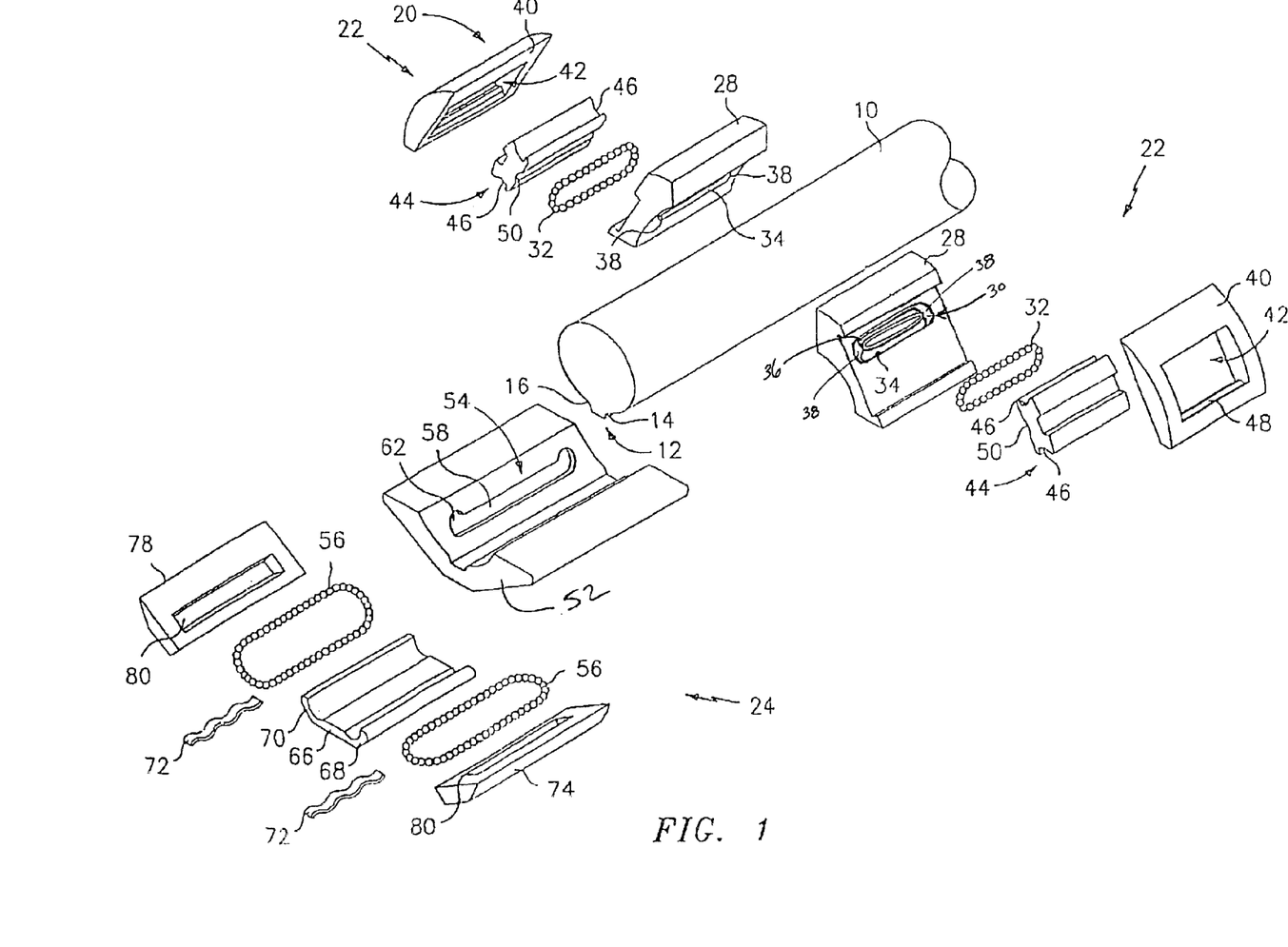
FIG. 1 is an exploded perspective view of a linear motion bearing segment, with the housing removed, in accordance with one embodiment of the present invention.
Figure 2:
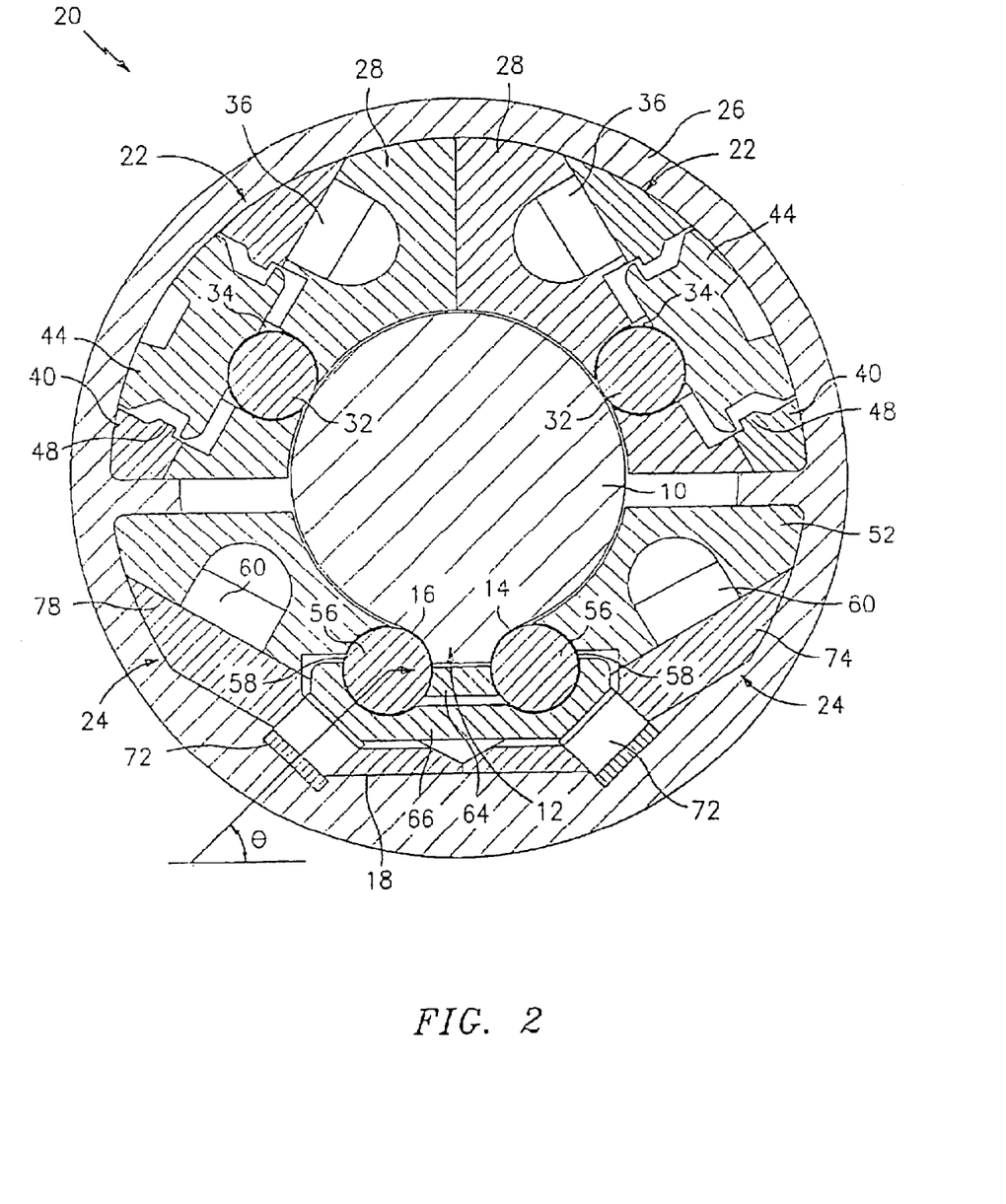
FIG. 2 is a transverse cross-sectional view of an assembled linear motion bearing segment shown in FIG. 1.

Linear motion bearing segment 20 is fabricated from a pair of individual quarter arcuate interengageable self-contained ball retainer segments 22 and a half arcuate interengageable self-contained ball retainer segment 24 all of which are supported in interengageable association within a housing 26. The housing 26 includes a longitudinal groove 18 formed along an inner surface thereof for engaging the half arcuate retainer segment 24. Stated differently, the linear motion bearing segment 20 is fabricated from a pair of 90° arcuate interengageable self-contained ball retainer segments 22 and a single 180° arcuate interengageable self-contained ball retainer segment 24. When fully assembled, the quarter segments 22 and the half segment 24 for a linear motion bearing segment 20 are adapted and configured to move on a splined shaft 10 without rotational motion of the bearing segment 20 relative to a longitudinal axis of the splined shaft 10. Further, although shown as a closed-type bearing, an open-type bearing could be readily fabricated using such self-contained segments.

Each quarter segment 22 includes an inner portion 28 having an inner surface configured and adapted to be in clearance to the adjacent quarter arcuate portion of the outer surface of the splined shaft 10, the inner portion 28 defining a ball bearing track 30 formed therein and which ball bearing track 30 retains a plurality of bearing balls 32. The ball bearing track 30 is made up of a load bearing portion 34 and a return portion 36 interconnected by turnarounds 38. An outer lid portion 40 is adapted and configured to engage the inner portion 28 and includes a load bearing plate mounting aperture 42. By way of example only, the outer lid portion 40 can be snap fit into engagement with the inner portion 28. However, other engagement mechanisms, such as pins, grooves, adhesives, etc. are also contemplated and are within the scope of knowledge of one skilled in this art.

A load bearing plate 44 is dimensioned and configured to fit into aperture 42 of outer lid portion 40 of each quarter bearing 22. A pair of longitudinal grooves 46 are formed in the side walls of each load bearing plate 44, which grooves 46 receive projections 48 formed in the periphery of aperture 42. Each load bearing plate 44 preferably includes at least one longitudinal track 50 formed in an inner surface thereof. This longitudinal track 50 serves as the upper surface of the load bearing portion 34 of the ball track 30. The plurality of bearing balls 32 are positioned in ball track 30 and, when in the load bearing portion 34, serve to transmit loads from the load bearing plates 44 to the splined shaft 10 as well as to facilitate reciprocal longitudinal motion therealong.

Figure 3:
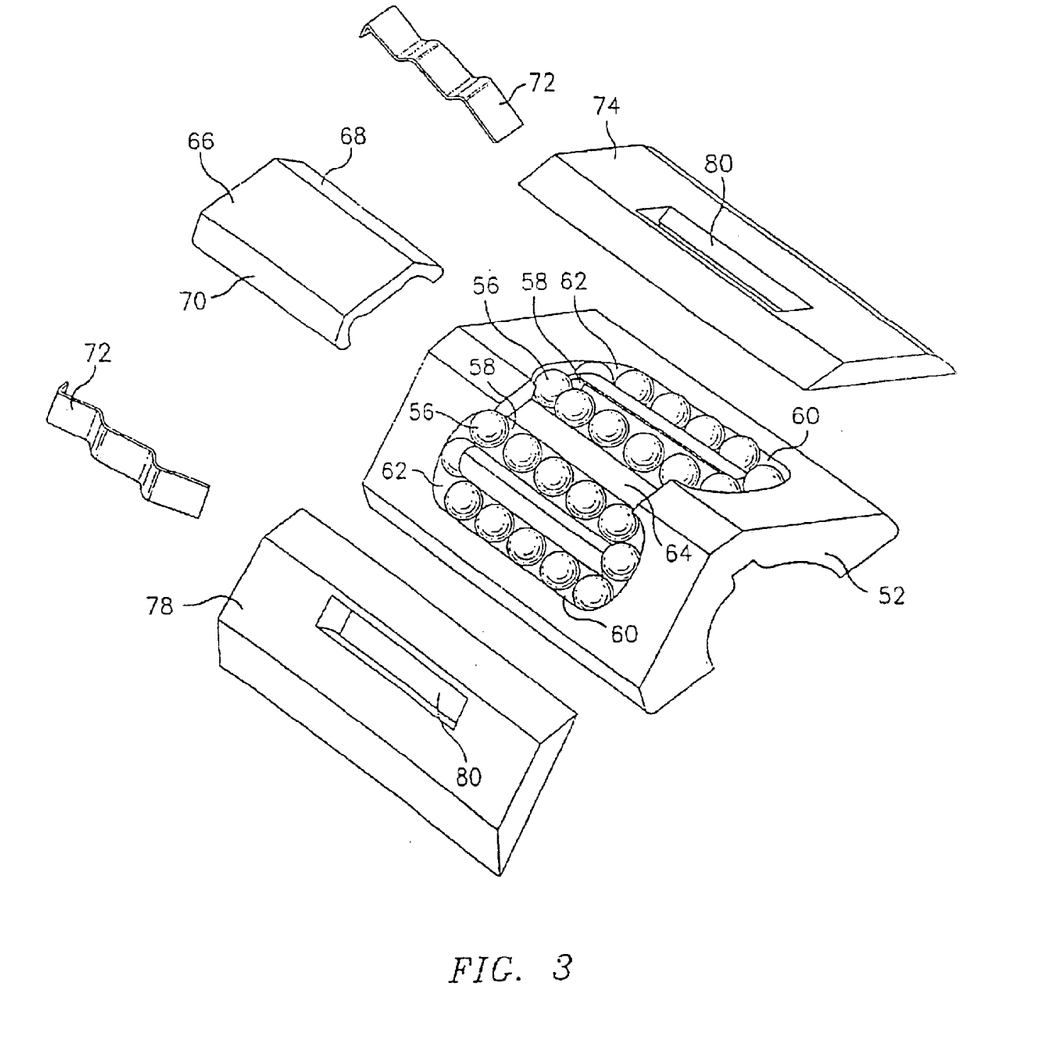
FIG. 3 is an exploded perspective view of a half bearing segment of the linear motion bearing segment shown in FIG. 1.
Figure 4:
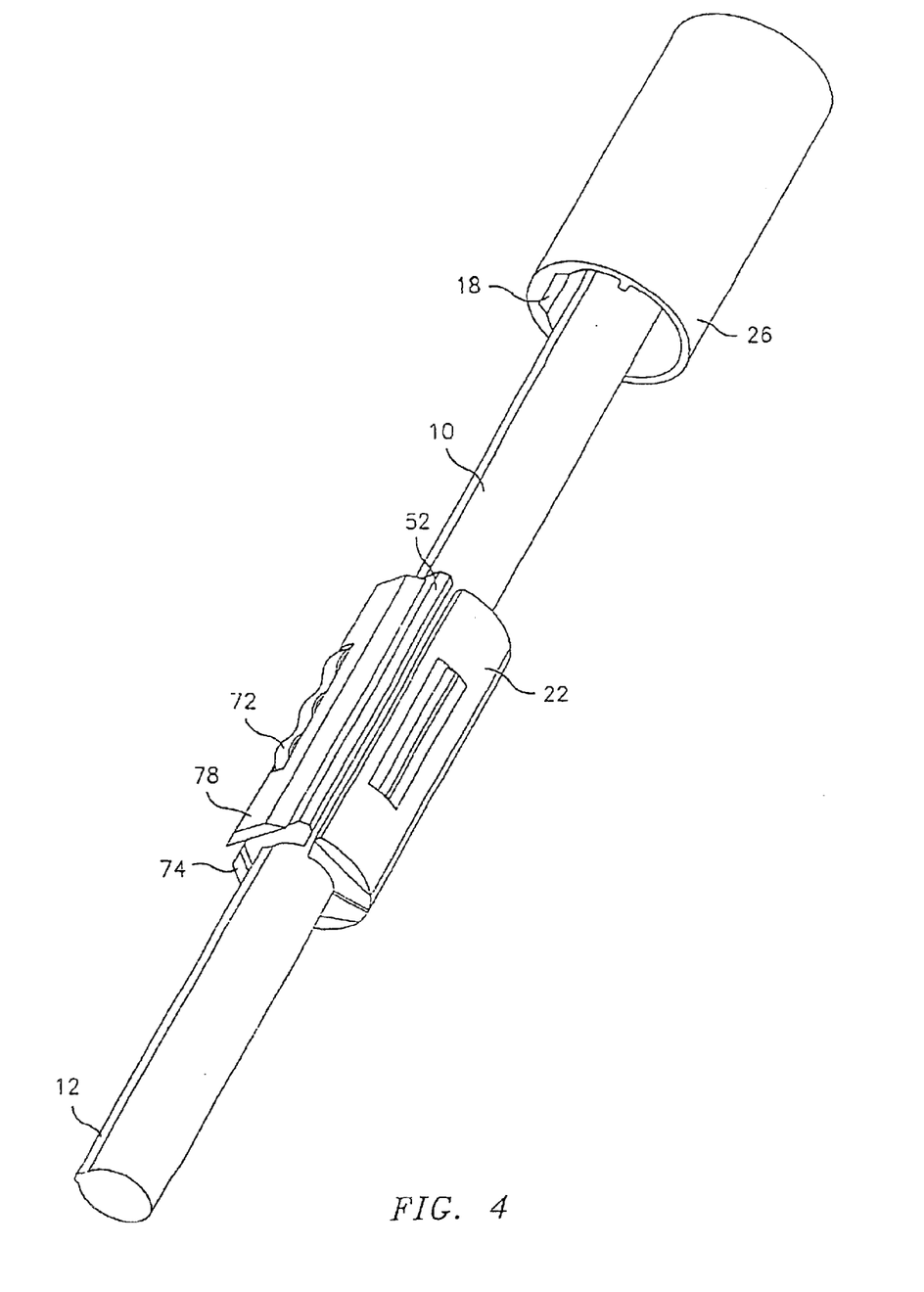
FIG. 4 is a perspective view of the linear motion bearing segment with the housing removed and in place in a splined shaft.
Figure 5:
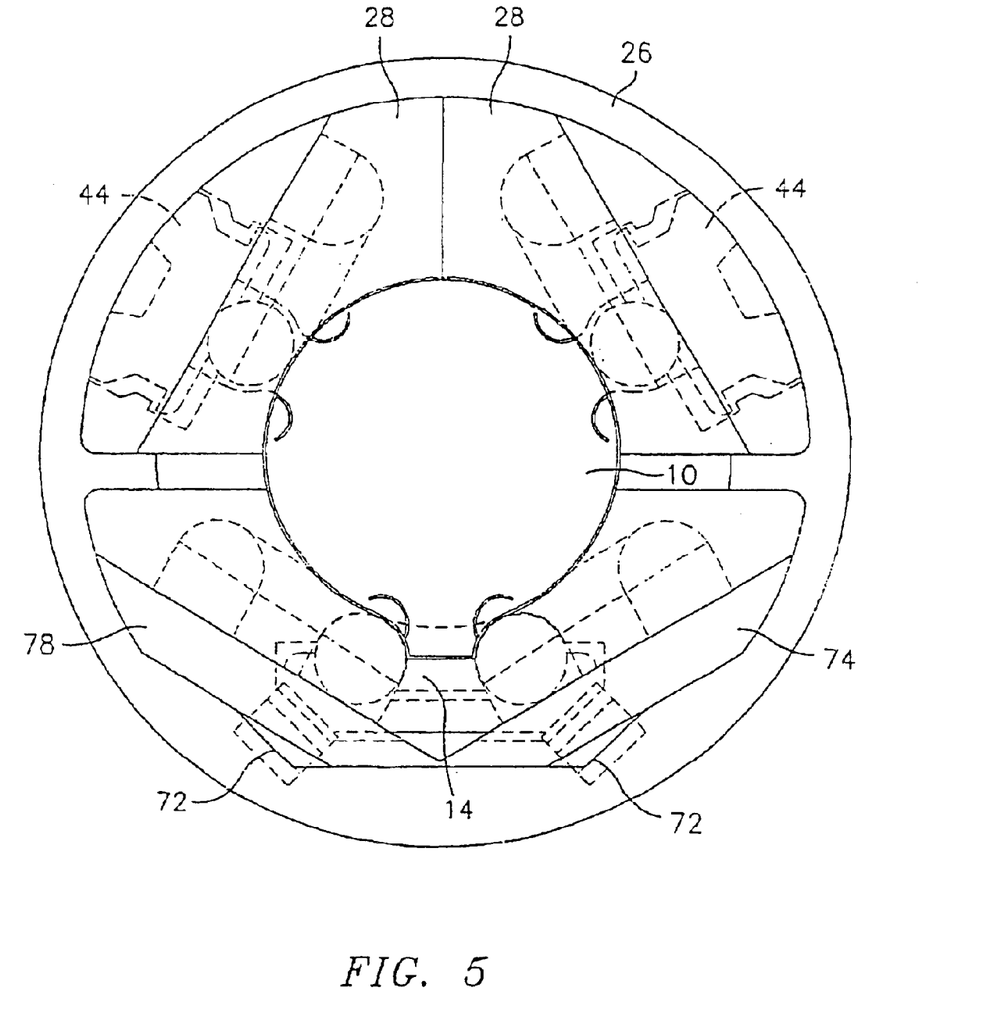
FIG. 5 is an end elevational view of the linear motion bearing segment showing the internal elements of the bearing segment in phantom.

As seen in FIGS. 1 and 2, and in particular in FIG. 3, the half arcuate ball retainer segment 24 includes a base portion 52 having an inner surface configured and adapted to be in substantial clearance of spline 12 formed along a longitudinal length of the shaft 10. The base portion 52 includes an outer surface defining a pair of independent ball bearing tracks 54 formed therein and which ball bearing tracks 54 retain a plurality of bearing balls 56. Each ball bearing track 54 is made up of a load bearing portion 58 and a return portion 60 interconnected by turnarounds 62. The respective load bearing portions 58 are located adjacent to one another and are spaced from one another by a retaining member 64 formed longitudinally along the base portion 52.

The half arcuate ball retainer segment 24 further includes a single load bearing plate 66 having an inner surface configured and adapted to be disposed over both load bearing portions 58 of each ball bearing track 54 and an outer surface defining a pair of longitudinally extending convergent flat portions 68 and 70. Each convergent flat portion 68 and 70 is configured and adapted to engage a biasing spring 72. In addition, the half arcuate ball retainer segment 24 further includes a pair of lids 74 and 78, which lids 74 and 78 serve to close the half retainer segment 24. Each lid 74 and 78 includes a window 80 for receiving one of the convergent flats 68 and 70 respectively of the of the load bearing plate 66 and through which window 80 each biasing spring 72 can extend to contact the inner surface of the housing 26. (See FIG. 4)

In use, each biasing spring 72 applies a pre-load to the bearing balls 56 through each convergent flat 68 and 70 of the load bearing plate 66. The pre-load being applied against opposite sides 14 and 16 of the spline 12 at an angle "θ" in a range of between about 25° to about 75°. (See FIG. 2). While the biasing spring 72 is shown as a corrugated leaf spring, it is envisioned that other biasing springs may be substituted including resilient plastic filler, coil springs, torsion springs, etc., with corresponding adaptations to the housing and bearing plates.

Although shown herein in a half bearing segment configuration, it is also contemplated that other sizes can be used including quarters or thirds and that the segments can be arranged to accommodate multiple splines on an elongate shaft.

Figure 6:
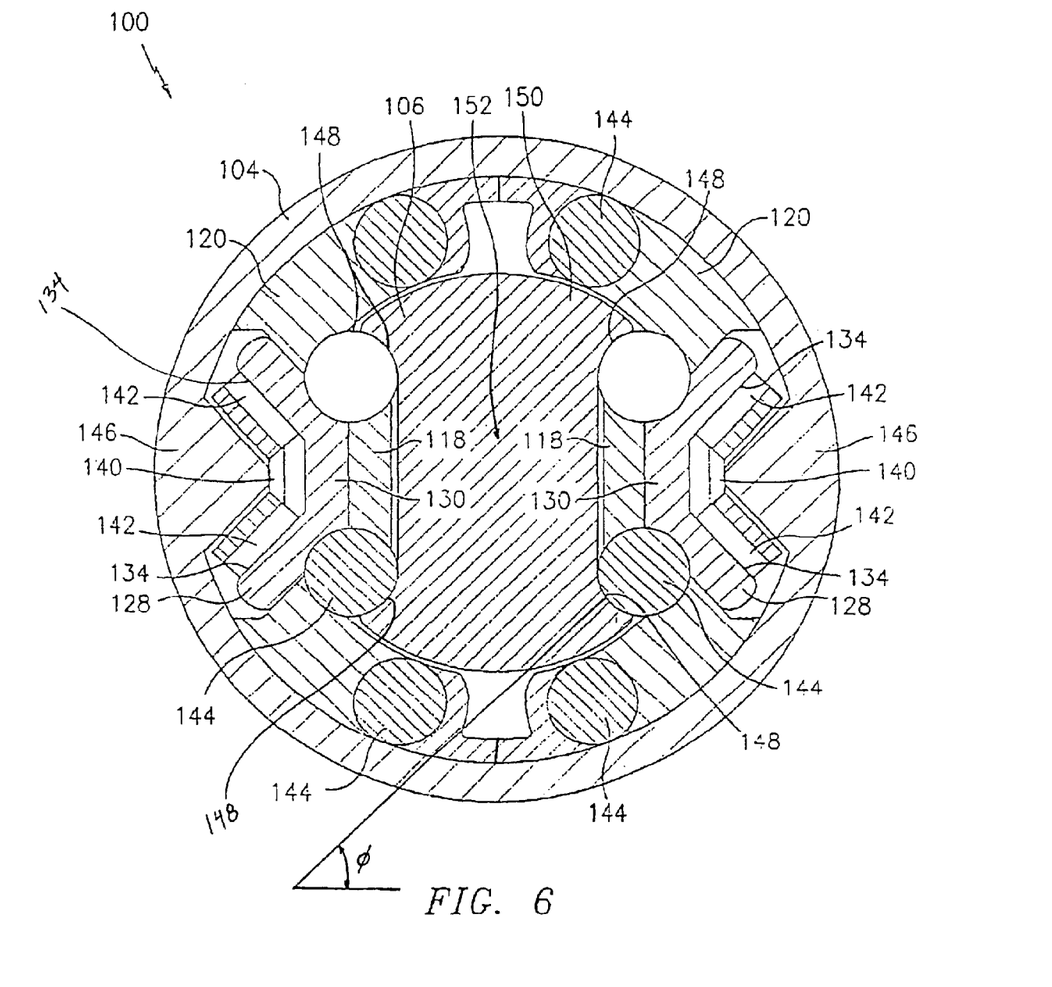
FIG. 6 is a transverse cross-sectional view of a linear motion bearing segment in accordance with a second embodiment of the present invention.
Figure 7:
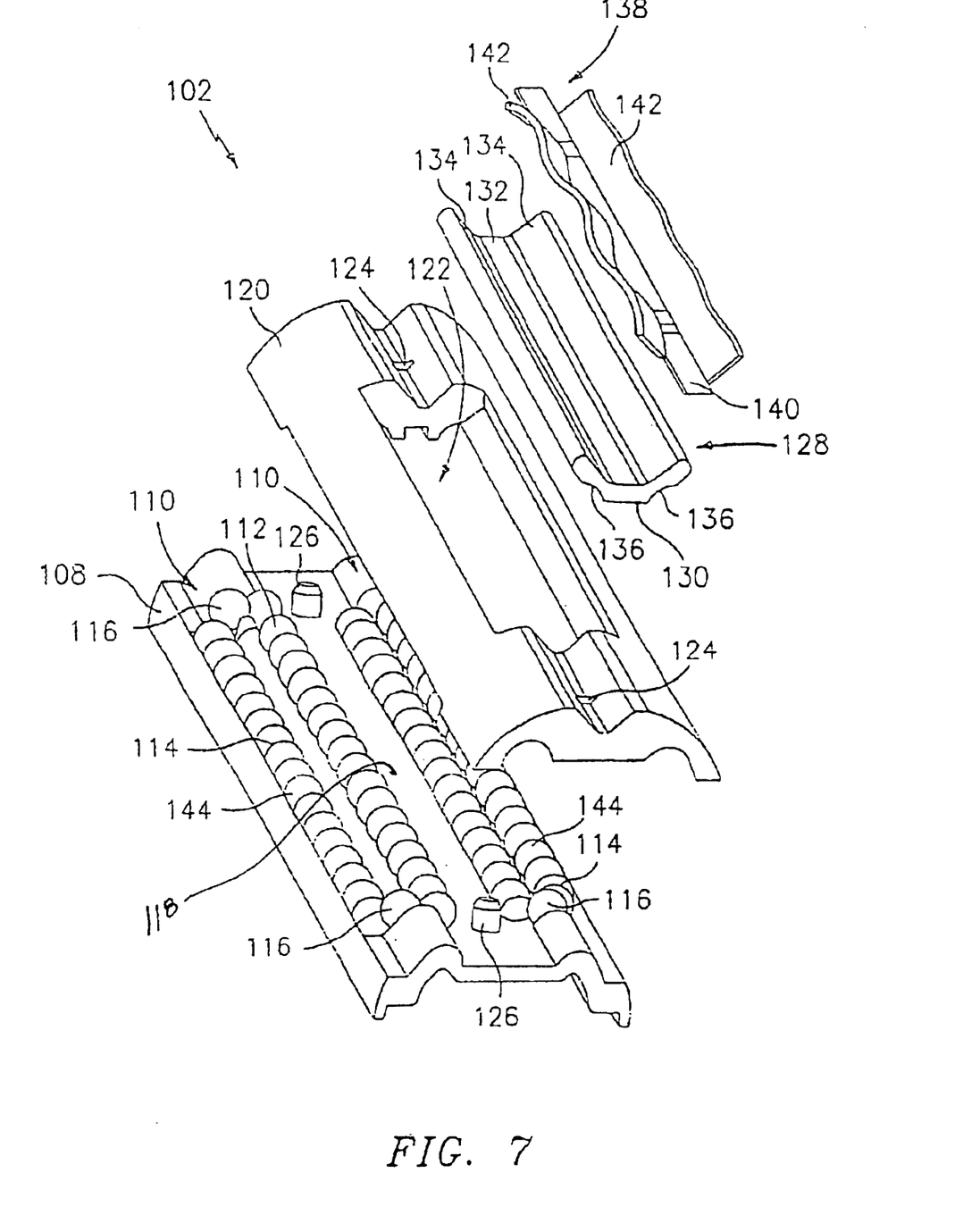
FIG. 7 is an exploded perspective view of the half bearing segment of the linear motion bearing segment shown in FIG. 6.

Referring now to FIGS. 6 and 7, there is illustrated a closed-type linear motion bearing segment constructed in accordance with a further embodiment of the present invention and designated generally by the reference numeral 100. The linear motion bearing segment 100 is fabricated from a pair of individual half arcuate interchangeable self-contained ball retainer segments 102 supported in interengageable association within a housing 104. When fully assembled, the half segments 102 are adapted and configured to move on a splined shaft 106, having a substantially "I" shaped cross-section, without rotational motion of the bearing segment 100 relative to a longitudinal axis of the splined shaft 106. Further, although shown as a closed-type linear bearing, an open-type linear bearing could be readily fabricated using such self-contained segments.

Each half segment 102 includes an inner portion 108 having an inner surface configured and adapted to be in substantial clearance of a lateral half of the splined shaft 106 and an outer surface defining a pair of independent ball bearing tracks 110 formed therein. Each ball bearing track 110 is made up of a load bearing portion 112 and a return portion 114 interconnected by turnarounds 116. The respective load bearing portions 112 of each inner portion 108 are located adjacent to one another and are spaced from one another by a dividing member 118.

Each half segment 102 includes an outer lid portion 120 configured to engage inner portion 108 and includes a load bearing plate aperture 122. In the embodiment depicted in FIGS. 6 and 7, engagement of each outer lid portion 120 to each inner portion 108 is accomplished by through holes 124 formed in the outer lid portion 120 and pegs 126 extending from an outer surface of the inner portion 108 configured and adapted to engage the through holes 124. Other engagement mechanisms, such as pins, grooves, adhesives, etc. are also contemplated and are within the scope of knowledge of one skilled in the art.

Each half segment 102 includes a load bearing plate 128 dimensioned and configured to fit into the load bearing plate aperture 122 of outer lid portion 120 and adapted to be disposed over both load bearing portions 112 of each ball bearing track 110. The load bearing plate having a central body portion 132 and a pair of longitudinally extending divergent flat portions 134. An inner surface 130 of the load bearing plate preferably includes a pair of longitudinal tracks 136 which serve as an upper surface of the load bearing portion 112 of the ball track 110.

Meanwhile, the outer surface 132 of the load bearing plate 128 is configured and adapted to engage a biasing spring 138. The biasing spring 138 includes a elongate body portion 140 and a pair of elongate diverging corrugated leaf portions 142. The diverging leafs 142 of the biasing spring 138 are configured and oriented such that each leaf portion 142 engages a respective divergent flat portion 134 of the load bearing plate 128. A plurality of bearing balls 144 are positioned in each ball bearing track 110 and, when in the load bearing portion 112, serve to transmit loads from the load bearing plates to the splined shaft 106 as well as to facilitate reciprocal longitudinal motion therealong. The housing 104 includes a pair of opposed "V" shaped protrusions 146 extending inwardly from an inner surface thereof and configured and adapted to engage an outer surface of the elongate body portion 140 of each biasing spring 138. The "V" shaped protrusion presses the biasing spring 138 such that the diverging leaf portions 142 press against the divergent flat portion 134 of the outer surface of load bearing plate 128.

In use, each biasing spring 138 applies a pre-load to the bearing balls 144 through each diverging flat portion 134 of the load bearing plate 128. The pre-load being applied at each juncture 148 of the "I" shaped shaft 106 between the pair of horizontal portions 150 and the interconnecting web portion 152 at an angle "φ" in a range between about 25° to about 75° and more preferably about 45°. (See FIG. 6). Once again, while the biasing spring 138 is shown as having a pair of corrugated leaf springs, it is envisioned that other biasing springs may be substituted including resilient plastic filler, coil springs, torsion springs, etc.

It is envisioned that both the base portion 52 and the lids 74 and 78 of the half bearing segment 24 of the first embodiment and the inner portion 108 and outer lid portion 120 of the second embodiment are preferably formed from an engineering polymer to facilitate ease of manufacture.

To the extent not already indicated, it also will be understood by those of ordinary skill in the art that any one of the various specific embodiments herein described and illustrated may be further modified to incorporate features shown in the other specific embodiments.

The invention in its broader aspects therefore is not limited to the specific embodiments herein described but departures may be made therefrom within the scope of the accompanying claims without sacrificing its chief advantages.

What is claimed:

1. A linear motion bearing assembly for movement along a guide way, a rail or a splined shaft, comprising:
   a ball retainer structure formed of a plurality of self-contained ball retainer segments, each of said ball retainer segments including
      an inner portion defining at least one ball track having
         an open load bearing portion,
         an open return portion, and
         turnarounds interconnecting said load bearing and return portions, and
      an outer lid portion defining a load bearing plate aperture formed therein;
   a load bearing plate positioned at least partially in said load bearing plate aperture of each outer lid portion such that said load bearing plate is positioned adjacent said load bearing portion of said ball track;
   a plurality of bearing balls disposed in said ball tracks for transmitting a load from said shaft to said load bearing plate and for facilitating a movement of said linear motion bearing assembly along said rail;
   an extended housing retainer structure enclosing substantially all of an exposed exterior surface of said ball retainer structure and having an inner surface in direct contact with said outer lid portions, said extended housing retainer structure being configured and dimensioned to maintain said outer lid portions in position and for receiving said load either directly or indirectly from said load bearing plates; and
   biasing means disposed between said bearing plate and said inner surface of said extended housing retainer structure, wherein said biasing means extends through said aperture in at least one of said outer lid portions, and wherein each biasing means applies a pre-load to the plurality of bearing balls disposed in said ball tracks.

2. The linear motion bearing assembly of claim 1, wherein said ball retainer structure is formed of a pair of individual quarter arcuate interengageable self contained ball retainer segments and a half arcuate interengageable self contained ball retainer segments.

3. The linear motion bearing assembly of claim 2, wherein said half arcuate retainer segment includes a pair of ball tracks and one load bearing plate.

4. The linear motion bearing assembly of claim 3, wherein said load bearing portion of each of said pair of ball tracks in said half arcuate retainer segment are arranged in side-by-side configuration within said half arcuate retainer segment and are separated from one another by a dividing member formed in said inner portion of said half arcuate retainer segment.

5. The linear motion bearing assembly of claim 4, wherein said inner portion of said half arcuate retainer segment is configured and adapted to mate with a spline formed along a length of said shaft.

6. The linear motion bearing assembly of claim 4, wherein one of said load bearing plates simultaneously engages said load bearing portion of each of said pair of ball tracks.

7. The linear motion bearing assembly of claim 6, wherein load bearing plate of said half arcuate retainer segment includes a pair of longitudinally extending convergent flat portions configured and adapted to engage said aperture formed in each of said outer lid portions.

8. The linear motion bearing assembly of claim 7, further comprising biasing means disposed between each convergent flat portion of said bearing plate and said inner surface of said extended housing retainer structure, said biasing means extending through said aperture in each of said outer lid portions, wherein each biasing means applies a pre-load to the plurality of bearing balls disposed in said pair of ball tracks.

9. The linear motion bearing assembly of claim 8, wherein said pre-load is applied against opposite sides of said spline at an angle in a range between about 25° to about 75°.

10. The linear motion bearing assembly of claim 1, wherein said plurality of self-contained ball retainer segments are interengageable.

11. The linear motion bearing assembly of claim 1, wherein said ball retainer structure is formed of a pair of half arcuate interengageable self contained ball retainer segments.

12. The linear motion bearing assembly of claim 11, wherein each half arcuate retainer segment includes a pair of ball tracks formed therein.

13. The linear motion bearing assembly of claim 12, wherein said load bearing portion of each of said pair of ball tracks in said half arcuate retainer segment are arranged in side-by-side configuration within said half arcuate retainer segment and are separated from one another by a dividing member formed in said inner portion of said half arcuate retainer segment.

14. The linear motion bearing assembly of claim 13, wherein said rail includes a pair of substantially horizontal portions and an interconnecting web portion thereby defining an interface between said horizontal and said web portions, and wherein said inner portion of said half arcuate retainer segment is configured and adapted to mate with a lateral half of said rail.

15. The linear motion bearing assembly of claim 14, wherein said load bearing plates simultaneously engages said load bearing portion of each of said pair of ball tracks.

16. The linear motion bearing assembly of claim 15, wherein each of said load bearing plates includes a central body portion, a pair of longitudinally extending divergent flat portions, an outer surface, an inner surface oriented to be fit into said load bearing plate aperture, and a pair of longitudinally extending tracks formed along said inner surface, which pair of tracks serve as an upper surface of said load bearing portions of said ball bearing tracks.

17. The linear motion bearing assembly of claim 16, further comprising biasing means disposed between said outer surface of each of said load bearing plates and said inner surface of said extended housing retainer structure, wherein said biasing means includes an elongate body portion and a pair of elongate diverging corrugated leaf portions configured and adapted to engage said outer surface of said pair of divergent flat portions of each of said bearing plates, said biasing means applying a pre-load to the plurality of bearing balls in said load bearing portion of said pair of ball tracks.

18. The linear motion bearing assembly of claim 17, wherein said pre-load is applied to said bearing balls along said interface between said horizontal portion and said web portion of said splined shaft at an angle in a range between about 25° to about 75°.

19. The linear motion bearing assembly of claim 17, wherein said housing retainer structure includes a pair of V-shaped projections extending inwardly from an inner surface of said housing structure, and wherein each protrusion engages an outer surface of said biasing means which in turn presses into said load bearing plates thereby transmitting said pre-load to said bearing balls and against said interface in said rail.

20. A linear motion bearing assembly for movement along a rail, the rail including an upper and a lower portion interconnected by a web portion with the upper and lower portions having a width greater than the web portion, the linear motion bearing assembly, comprising:
- a ball retainer structure formed of a pair of half arcuate self-contained ball retainer segments, each of said pair of half arcuate ball retainer segments includes
  an inner portion defining a pair of ball bearing tracks and having an inner surface configured and adapted to mate with a lateral surface of said rail, with each ball bearing track having
    an open load bearing portion,
    an open return portion, and
    turnarounds interconnecting said load bearing and return portions, wherein each load bearing portion of each ball bearing track is disposed adjacent to one another;
  an outer lid portion defining a load bearing plate aperture formed therein;
- a load bearing plate having a central body portion, a pair of longitudinally extending divergent flat portions, an outer surface, an inner surface oriented to be fit into said load bearing plate aperture, and a pair of longitudinally extending tracks formed along said inner surface, which pair of tracks serve as an upper surface of said load bearing portions of said ball bearing tracks;
- a plurality of bearing balls disposed in each of said pair of ball bearing tracks for transmitting a load from said rail to said load bearing plate and for facilitating a movement of said linear motion bearing assembly along said rail;

an extending housing retainer structure including a pair of V-shaped projections extending inwardly from an inner surface of said housing structure; and biasing means having an elongated body portion and a pair of elongate corrugated leaf portions, said biasing means being disposed between said outer surface of each of said load bearing plates and said V-shaped projections of said housing retainer structure, wherein V-shaped projections press into said biasing means thereby applying a pre-load to said plurality of bearing balls in said load bearing portion of said pair of ball tracks which in turn press into said rail at each juncture between said upper and lower portions and said web portion.

* * * * *